(12) United States Patent
Sun et al.

(10) Patent No.: US 12,486,463 B2
(45) Date of Patent: Dec. 2, 2025

(54) SEPARATION METHOD OF HIGH-TEMPERATURE FISCHER-TROPSCH SYNTHETIC LIGHT OIL

(71) Applicant: Yankuang Energy R&D Co., Ltd., Shanghai (CN)

(72) Inventors: Qiwen Sun, Shanghai (CN); Zhengwei Yang, Shanghai (CN); Jisen Liu, Shanghai (CN); Gerui Cui, Shanghai (CN); Chen Shen, Shanghai (CN); Wei Jin, Shanghai (CN); Zongsen Zhang, Shanghai (CN)

(73) Assignee: Yankuang Energy R&D Co., Ltd., Shanghai (CN)

( * ) Notice: Subject to any disclaimer, the term of this patent is extended or adjusted under 35 U.S.C. 154(b) by 0 days.

(21) Appl. No.: 18/578,826

(22) PCT Filed: Nov. 28, 2022

(86) PCT No.: PCT/CN2022/134564
§ 371 (c)(1),
(2) Date: Jan. 12, 2024

(87) PCT Pub. No.: WO2024/060399
PCT Pub. Date: Mar. 28, 2024

(65) Prior Publication Data
US 2025/0101321 A1 Mar. 27, 2025

(30) Foreign Application Priority Data

Sep. 23, 2022 (CN) .......................... 202211164248.2

(51) Int. Cl.
*C10G 53/04* (2006.01)

(52) U.S. Cl.
CPC ..... *C10G 53/04* (2013.01); *C10G 2300/1081* (2013.01); *C10G 2300/1088* (2013.01);
(Continued)

(58) Field of Classification Search
CPC ............ C10G 53/04; C10G 2300/1081; C10G 2300/1088; C10G 2300/1096;
(Continued)

(56) References Cited

U.S. PATENT DOCUMENTS

2006/0211907 A1* 9/2006 Pieter de Wet ........ C10G 21/00
585/864
2009/0255853 A1* 10/2009 Lee ........................ C10G 21/06
208/312

FOREIGN PATENT DOCUMENTS

CN 103360201 A 10/2013
CN 103664498 A 3/2014
(Continued)

OTHER PUBLICATIONS

CN 112745912 English Translation (Year: 2019).*

*Primary Examiner* — Randy Boyer
*Assistant Examiner* — Juan C Valencia
(74) *Attorney, Agent, or Firm* — Woodard, Emhardt, Henry, Reeves & Wagner, LLP

(57) ABSTRACT

The application provides a method for simultaneously removing oxygen-containing compounds and aromatics from high-temperature Fischer-Tropsch synthetic light oil, comprising: subjecting the light oil and a composite extractant to a countercurrent single-stage or multi-stage extraction process in an extraction equipment, to obtain a raffinate phase stream, and an extract phase stream of oxygen-containing compounds+aromatics; washing the raffinate phase stream with water, to obtain a raffinate oil stream, from which oxygen-containing compounds and aromatics have been removed, and a water stream containing a small amount of extractants; and subjecting the extract phase stream to an extractive distillation process, to obtain a recycled stream rich in alkanes and olefins and a recycled solvent-rich stream, and carrying out a regeneration cycle on
(Continued)

the solvent-rich stream through a solvent recovery tower and a regeneration distillation tower. Oxygen-containing compounds, and aromatics in the light oil are removed together.

17 Claims, 1 Drawing Sheet

(52) U.S. Cl.
CPC ................ *C10G 2300/1096* (2013.01); *C10G 2300/4006* (2013.01); *C10G 2300/4012* (2013.01); *C10G 2300/805* (2013.01); *C10G 2400/30* (2013.01)

(58) Field of Classification Search
CPC .... C10G 2300/4006; C10G 2300/4012; C10G 2300/805; C10G 2400/30; C10G 2300/202; C10G 21/27; C10G 2300/1022; C10G 21/28
See application file for complete search history.

(56) References Cited

FOREIGN PATENT DOCUMENTS

| | | | | |
|---|---|---|---|---|
| CN | 112745907 A | | 5/2021 | |
| CN | 112745912 A | * | 5/2021 | ............. C10G 53/12 |
| CN | 112745913 A | | 5/2021 | |

* cited by examiner

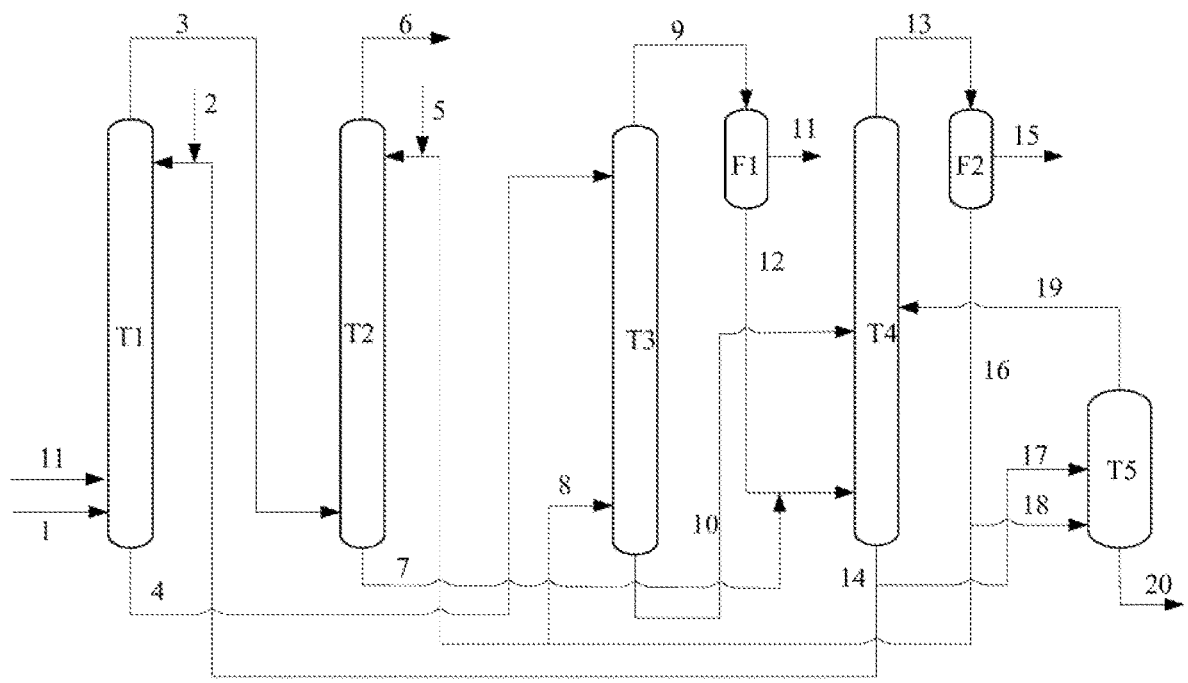

SEPARATION METHOD OF HIGH-TEMPERATURE FISCHER-TROPSCH SYNTHETIC LIGHT OIL

FIELD OF THE DISCLOSURE

The invention belongs to the technical field of chemical separation, particularly to a method for simultaneously removing oxygen-containing compounds and aromatics from high-temperature Fischer-Tropsch synthetic light oil.

BACKGROUND

With the decrease of international oil and gas resources, and changes in market conditions, as well as increasingly stringent environmental protection requirements, the development and industrialization of coal liquefaction and natural gas liquefaction technologies centered on Fischer-Tropsch synthesis are gaining significance in ensuring the security of national oil supply, energy conservation and emission reduction.

Fischer-Tropsch synthesis is a technology for synthesizing liquid fuels with synthesis gas as raw material under catalyst and certain reaction conditions. It is an effective means to convert coal or natural gas into liquid fuels and other chemicals. Fischer-Tropsch synthetic oil is the main product of Fischer-Tropsch synthesis. It has the characteristics of being free of sulfur, free of nitrogen, and rich in aliphatic hydrocarbons. It is an important raw material to produce fuel oil and refine chemical products, such as gasoline, diesel, aviation kerosene and a variety of high-value chemical products.

Fischer-Tropsch synthesis is divided into high-temperature Fischer-Tropsch synthesis and low-temperature Fischer-Tropsch synthesis. The ASF (Anderson-Shulz-Flory) distribution of high-temperature Fischer-Tropsch synthesis has a low $\alpha$-value, with mainly C5-C20 light oil fractions. From the perspective of family composition, most fractions of the high-temperature Fischer-Tropsch synthetic oil are olefins, especially linear $\alpha$-olefins, followed by alkanes, and small amounts of oxygen-containing compounds. It also contains small amounts of aromatics, and the content of aromatics in the diesel fraction is about 10%. Linear $\alpha$-olefins in high-temperature Fischer-Tropsch synthetic oil are important chemical synthesis raw materials, which can be separated and purified for high value-added products such as comonomers, synthetic PAOs (Poly Alpha Olefins), alkylbenzenes, higher alcohols, and higher esters.

High-temperature Fischer-Tropsch synthetic oil contains certain amounts of oxygen-containing compounds such as alcohols, aldehydes, ketones, acids, and esters. These oxygen-containing compounds have a serious impact on the separation and deep processing of oil products. The specific manifestations are: 1. Organic acids in oil products will corrode equipment in subsequent processing and affect the downstream development process of synthetic oil; 2. Oxygen-containing compounds will affect the downstream processing and transformation of alpha olefins, such as the synthesis of alkylbenzene and PAO; 3. Oxygen-containing compounds and hydrocarbon components can form azeotropes substances, affecting the separation and purification of $\alpha$-olefin products. Therefore, before the high value utilization of $\alpha$-olefins in Fischer-Tropsch synthetic oil, it firstly needs to be deoxidized.

C9-C11 $\alpha$-olefins are ideal raw materials for the synthesis of PAO. When using high-temperature Fischer-Tropsch synthesis of C9-C11 fractions as raw materials to synthesize PAO, in addition to oxygen-containing compounds, aromatics will also affect the quality of PAO products. Therefore, in order to synthesize high-quality PAO products, it is best to remove the aromatics in the oil as well.

Patent document U.S. Pat. No. 4,686,317 discloses a method for removing oxygen-containing compounds from hydrocarbon (C2-C9) components. The method uses organic solvents such as propylene carbonate, furfural, and ethanolamine as extraction agents. Through two-stage extraction and water washing, it can reduce the oxygen-containing compounds in the oil to less than 0.1%.

Patent document WO9958625 discloses a method for removing oxygen-containing compounds from hydrocarbon (C3-C20) streams, which uses acetonitrile with a water mass fraction of 18% as the extraction agent to remove oxygen-containing compounds from hydrocarbon streams to a low value.

Patent document U.S. Pat. No. 2,610,977 uses an aqueous solution of low-carbon alcohols such as methanol and ethanol as an extractant to remove the alcohol components in the oil under the condition that the solvent-oil ratio is 8-9:1.

Patent document U.S. Pat. No. 2,746,984 separates the aliphatic alcohol from the alcohol-hydrocarbon mixture, by first reacting the alcohol in the alcohol-hydrocarbon mixture with boric acid to form an ester, then extracting with methanol, ethanol, water, and other solvents, and then hydrolyzing the boric acid ester, to obtain aliphatic alcohols.

Patent document CN108822885A adopts a composite extractant composed of organic solvent, amine solvent and hydrocarbon organic solvent, which has excellent extraction and removal effect on oxygen-containing compounds in Fischer-Tropsch oil, and the removal rate of oxygen-containing compounds can reach up to 99% or more, and the hydrocarbon loss rate can be as low as less than 1%.

The above methods are only treatments of Fischer-Tropsch synthetic oil to remove the oxygen-containing compounds, but for high-temperature Fischer-Tropsch synthetic oil containing certain amounts of oxygen-containing compounds and aromatics, it is necessary to develop a new solvent system and technology to remove aromatics as well as oxygen-containing compounds.

SUMMARY OF THE INVENTION

In view of the above technical problems, the object of the present invention is to provide a separation method for high-temperature Fischer-Tropsch synthetic light oil, which, through the combination of a composite extractant and an extraction process, can simultaneously remove the oxygen-containing compounds and aromatics in the light oil with high selectivity and high separation efficiency. And the raffinate can be used as raw materials for the synthesis of high-quality PAO products, with a simple process and high yield of aliphatic alkanes and olefins.

To achieve the above object, the present invention provides the following technical solutions.

A separation method of high-temperature Fischer-Tropsch synthetic light oil, comprising steps:

subjecting the high-temperature Fischer-Tropsch synthetic light oil and a composite extractant to a countercurrent single-stage or multi-stage extraction process in an extraction equipment, to obtain a raffinate phase stream, and an extract phase stream of oxygen-containing compounds+aromatics;

washing the raffinate phase stream with water, to obtain a raffinate oil stream, from which oxygen-containing compounds and aromatics have been removed, and a water stream containing a small amount of extractants;

subjecting the extract phase stream to an extractive distillation process, to obtain a recycled stream rich in alkanes and olefins and a recycled solvent-rich stream.

In some embodiments, the high-temperature Fischer-Tropsch synthetic light oil first enters a lower part of a liquid-liquid extraction tower, and is extracted in countercurrent with the composite extractant entering from an upper part, whereby the raffinate phase stream is extracted at a top of the liquid-liquid extraction tower, and the extract phase stream of oxygen-containing compounds+aromatics is extracted at a bottom of the liquid-liquid extraction tower; and, the raffinate phase stream enters a lower part of a water washing tower, and after contacting in countercurrent with a water stream entering from an upper part of the water washing tower, whereby the raffinate oil stream from which oxygen-containing compounds and aromatics have been removed is obtained at a top of the water washing tower, and the water stream containing a small amount of extractants is obtained at a bottom of the water washing tower; and, the extract phase stream enters an upper part of a stripping tower, and one or more solvents in the extract phase stream are used as extractants to carry out the extractive distillation process of the extract phase stream, and a water stream rich in alkanes and olefins obtained at a top of the stripping tower is condensed and introduced into a liquid-liquid separator, whereby the stream rich in and olefins separated at an upper layer is recycled to the lower part of the liquid-liquid extraction tower, and the solvent-rich stream is obtained at the bottom of the stripping tower.

In some embodiments, the method further comprises steps:

introducing the water stream obtained at the bottom of the water washing tower, a water stream obtained at the top of the stripping tower, and the solvent-rich stream obtained at the bottom of the stripping tower into a solvent recovery tower for vacuum stripping;

condensing and then introducing a steam at a top of the solvent recovery tower into another liquid-liquid separator, to achieve a separation into two phases of oil and water, wherein an upper layer is an oil-phase stream of oxygen-containing compounds and aromatics, and a lower layer is a water-phase stream; whereby the water-phase stream is divided into three streams and recycled to the water washing tower, the stripping tower, and a regeneration distillation tower respectively;

obtaining a lean solvent stream at the bottom of the solvent recovery tower which is divided into two streams, wherein one stream is recycled to the liquid-liquid extraction tower and the other stream is introduced to the regeneration distillation tower.

In some embodiments, the mothed further comprises:

introducing part of the lean solvent stream obtained at the bottom of the solvent recovery tower into the regenerative distillation tower, and utilizing the water-phase stream obtained at the lower layer at the top of the solvent recovery tower as a stripping agent to carry out a vacuum stripping distillation process; wherein solvents and water are heated and evaporated in an evaporator, forming a solvent-water mixture stream at a top of the regenerative distillation tower, which returns to a lower part of the solvent recovery tower, and impurities with high boiling points which are not vaporized, are extracted from the bottom of the regenerative distillation tower.

In some embodiments, the composite extraction agent comprises components of volume percentage: a main solvent of 60-95%, a cosolvent of 1-40%, a modifier of 0.1-3%, and a polymerization inhibitor of 0.001-0.1%.

In some embodiments, the main solvent is a sulfolane;

the cosolvent is one of the following compounds or a mixture of more than one of the following compounds: a propylene carbonate, a levulinic acid, a dipropylene glycol, a tetraethylene glycol monomethyl ether and an N-formyl-morpholine;

the modifier is an aqueous solution of one or more of the following compounds: diethanolamine, N-methyl-diethanolamine, N-methyl-pyrrolidone, and 2-pyrrolidone;

the polymerization inhibitor is one of the following compounds or a mixture of more than one of the following compounds: hydroquinone, tert-butylcatechol, 2-o-nitrophenol and 2-sec-butyl-4,6-dinitrophenol.

In some embodiments, the high-temperature Fischer-Tropsch synthetic light oil is produced by a fluidized bed process at a reaction temperature of 350-400° C. and a pressure of 2.0-2.5 MPa, wherein the C5-C11 fraction is obtained by a separation process in a fractionation tower, and a C12+ fraction of the light oil is less than 0.1 wt %; and, the high-temperature Fischer-Tropsch synthetic light oil is composed of: 10-20 wt % of alkanes, 55-65 wt % of olefins, 5-15 wt % of aromatics and 5-15 wt % of oxygen-containing compounds.

In some embodiments, an operating temperature of the liquid-liquid extraction tower is 20-100° C., and an operating pressure is 0.1-0.5 MPa, and a volume ratio between the composite extractant and the Fischer-Tropsch synthetic light oil in the liquid-liquid extraction tower is 1-8, and a number of extraction stages is 1-12; and/or, a temperature of the water washing tower is 20-60° C., and a pressure thereof is 0.1-0.5 MPa, and a volume ratio between water and raffinate is 0.1-2, and a number of washing stages is 1-6.

In some embodiments, the stripping tower is configured such that, a theoretical plate number is 10-40, and a feed position is at the 1st3rd-20th plate from top, and a reflux ratio is 0.5-8, and a pressure at a top of the stripping tower is 5-30 kPa, and a temperature at the top is 70-100° C. and a temperature at the bottom is 140-180° C.; and/or, the solvent recovery tower is configured such that, a theoretical plate number is 15-60, and a feeding position is at the 5th-50th plate from top, and the reflux ratio is 0.5-8, and the pressure at the top is 5-30 kPa, and a temperature at the top is 70-120° C., and a temperature at the bottom is 150-185° C.; and/or, the regenerative distillation tower is a vacuum distillation tower configured such that, the mass ratio between the lean solvent stream entering the regenerative distillation tower and the lean solvent stream obtained at the bottom of the solvent recovery tower is 0.01-0.2, and an operating pressure at the bottom of the regenerative distillation tower is 5-30 kPa, and a temperature thereof is 130-190° C.

The present invention adopting the above technical solutions have at least the following beneficial effects:

1. In the aspect of the solvent. Aiming at the high-temperature Fischer-Tropsch synthetic oil system, a composite extractant with high selectivity and good stability is provided, which can remove oxygen-containing compounds and aromatics in the oil. Utilizing the difference in the interactions between the main solvent and the cosolvent on aromatics and oxygen-containing compounds, through complementary deployment, high selectivity, and high efficiency in the removal of oxygen-containing compounds and aromatics are achieved. Modifiers are introduced to adjust the acidity and alkalinity of the solvent, improving the stability of the solvent. A polymerization inhibitor is added to alleviate the problem that the Fischer-Tropsch synthetic oil with a high olefin content is easy to polymerize to impact the quality of the solvent. The extractant has a high boiling point and can achieve the deoxygenation and de-aromatization treatment of C9-C11 fractions with a final distillation temperature of 200-210° C. Compared with the existing technologies that separate only oxygen-containing compounds or separate only aromatics in the oil, the present invention has the advantages of a simple process flow and a low cost.

2. In the aspect of the process flow. Utilizing the characteristic that the solvent in the extract phase has a stronger effect on oxygen-containing compounds and aromatics than on aliphatic alkenes, a stripping tower is designed for the extract phase stream. The tower uses the solvent in the stream as the extractant to achieve a extractive distillation. The aliphatic alkenes entrained in the extraction phase are separated from aromatics and oxygen-containing compounds, which has the advantage of a high yield of aliphatic alkenes. In addition, a solvent regenerative distillation tower is designed to remove small amounts of high-boiling polymer impurities in the solvent through vacuum stripping, so that the solvent has good stability after long-term operation.

BRIEF DESCRIPTION OF THE DRAWINGS

To illustrate the technical solutions in the Embodiments of the present invention more clearly, the drawings and their symbols that are used in the Embodiments will be briefly introduced below. Obviously, the drawings described below are only some Embodiments of the present invention. For those skilled in the art, other drawings can also be obtained according to these drawings without creative efforts.

FIG. 1 is a schematic flow chart of a separation method of high-temperature Fischer-Tropsch synthetic light oil described in an Embodiment of the present invention.

The meanings of the marked symbols in the FIGURE are as follows.

T1: Liquid-liquid extraction tower; T2: Water washing tower; T3: Stripping tower; T4: Solvent recovery tower; T5: Regeneration distillation tower; F1: Liquid-liquid separator one; F2: Liquid-liquid separator two;

1: High temperature Fischer-Tropsch synthetic light oil stream; 2: Fresh extractant stream; 3: Raffinate phase stream; 4: Extract phase stream; 5: Fresh water stream; 6: Deoxygenated and de-aromatized oil stream; 7: Second water stream; 8: Recycled stripping water stream; 9: Aliphatic alkene+water stream; 10: Solvent-rich stream; 11: Aliphatic alkene stream; 12: Stripping tower top water phase stream; 13: Oxygen-containing compounds+aromatics+water stream; 14: First lean solvent stream; 15: Oxygen-containing compounds+aromatics stream; 16: Solvent recovery tower overhead water phase stream; 17: Second lean solvent stream; 18: Water stream into regeneration tower; 19: Solvent-water mixture stream; 20: High boiling impurity stream.

DESCRIPTION OF THE ILLUSTRATED EMBODIMENTS

To illustrate the Embodiments of the present application or the technical solutions in the prior arts more clearly, the specific Embodiments of the present application will be described below with reference to the accompanying drawings. Obviously, the accompanying drawings in the following description are only some Embodiments of the present application, and for those of ordinary skill in the art, other drawings can also be obtained from these drawings without creative efforts, to obtain other Embodiments.

To keep the drawings concise, only the parts related to the application are schematically shown in each FIGURE, and they do not represent the actual structure of the products. In addition, to make the drawings concise and easy to understand, in some FIGURES, only one of the components having the same structure or function is schematically shown, or only one of them is marked. As used herein, "one" not only means "only one", but also "more than one".

It should also be further understood that, as used in this specification and the claims, the term "and/or" refers to and including all possible combinations of one or more of the associated listed items.

In addition, in the description of the present application, the terms "first", "second" and the like are only used to distinguish the features, and should not be understood as indicating or implying relative importance.

The high-temperature Fischer-Tropsch synthetic oil of the present application is a light oil product obtained under the conditions of a reaction temperature of 370° C. to 380° C. and a pressure of 2.2 to 2.3 MPa using a fluidized bed process, and then fractionated and separated to obtain C5-C11 fractions, preferably a C9-C11 fraction, wherein the C12+ content in the fraction is less than 0.1%.

See Table 1 for the family composition of the high-temperature Fischer-Tropsch synthesis C9-C11 fractions involved in the following Embodiments.

TABLE 1

| Composition of C9-C11 in high temperature Fischer-Tropsch synthesis | |
|---|---|
| Composition | Content in wt % |
| Alkanes | 13.42 |
| Olefins | 63.88 |
| Aromatics | 8.87 |
| Oxygen-containing compounds | 13.83 |

Embodiment 1

According to the process shown in FIG. 1:

The high-temperature Fischer-Tropsch synthetic light oil stream 1 enters the lower part of the liquid-liquid extraction tower T1, and is extracted in countercurrent with the fresh extractant stream 2 entering from the upper part. Sulfolane is used as the main solvent, and levulinic acid is used as a cosolvent, and aqueous solution of diethanolamine is used as a modifier, and tert-butylcatechol is used as a polymerization inhibitor. The volume ratio of the main solvent:cosolvent:the modifier is 80:18:2. The mass ratio of diethanolamine and water in the modifier is 1:3, and the polymerization inhibitor is added in the amount of 0.003% of the total amount of the extractant. Under the condition that the volume ratio of C9-C11 fraction to extractant is 4, and the number of theoretical extraction stages is 3, and the extraction temperature is 40° C., and the pressure is 0.1 MPa, the raffinate phase stream 3 is extracted at the top of the tower, and the extract phase stream 4 is extracted at the bottom of the tower.

The raffinate phase stream 3 enters the lower part of the water washing tower T2, and is extracted in countercurrent with the fresh water stream 5 (first water stream 5) entering the upper part, with a water-to-oil volume ratio of 0.5, 3 theoretical extraction stages, a washing temperature of 30° C., and a pressure of 0.1 MPa. A deoxygenated and de-aromatized oil stream 6 is obtained, and a second water stream 7 containing a small amount of extractant is obtained at the bottom of the tower.

The extract phase stream 4 extracted at the bottom of the liquid-liquid extraction tower enters the upper part of the stripping tower T3, and the solvent in the stream is used as an extractant to achieve an extractive distillation of the extract phase stream, to recover the aliphatic alkenes entrained in the extract phase. Under the condition that the number of theoretical plates is 25, and the feed position is at the 5th plate from the top, and the reflux ratio is 3, and the pressure at the top of the tower is controlled at 0.015 MPa, and the temperature at the top of the tower is 85-87° C., and the temperature of the bottom of the tower is 166-168° C., the aliphatic alkene+water stream 9 obtained at the top of the tower is condensed and then enters the liquid-liquid separator F1. Then it is divided into two layers of oil and water in the liquid-liquid separator F1. The upper oil phase is the aliphatic alkene stream 11 and recycles to the bottom of the liquid-liquid extraction tower to increase the yield of aliphatic alkanes in the raffinate. The lower layer forms the stripping tower top water phase stream 12. A rich solvent stream 10 is obtained at the bottom of the tower.

The rich solvent stream 10 enters the middle part of a solvent recovery tower T4, and the second water stream Z containing a small amount of solvent extracted from the bottom of the washing tower enters the lower part of the solvent recovery tower T4 together with the water phase stream 12 at the top of the stripping tower. Under the conditions that the number of theoretical plates is 20, and the feed position is at the 10th plate from the top, and the reflux ratio is 3, and the operating pressure at the top of the tower is 0.006 MPa, and the temperature at the top of the tower is 85-90° C., and the temperature at the bottom of the tower is 175-180° C., the condensed stream at the top of the tower enters a liquid-liquid separator two F2 and is divided into two layers of oil and water in the liquid-liquid separator two F2. The upper oil phase is oxygen-containing compound+aromatic hydrocarbon stream 15, and the lower water phase stream 16 is recycled to the water washing tower T2, stripping tower T3, and regenerative distillation tower T5. The regenerated extractant stream extracted at the bottom of the tower is divided into two streams. One stream is a first lean solvent stream 14, which recycles to the liquid-liquid extraction tower T1, and the other second lean solvent stream 17 enters the regeneration distillation tower T5.

The second lean solvent stream 17 and the water stream 18 enter the regenerative distillation tower T3. The ratio between the amount of the second lean solvent 17 and the amount of lean solvent extracted from the bottom of the solvent recovery tower is 0.1. At a temperature of 165° C. and a pressure of 20 kPa, the solvent and water are heated and evaporated in an evaporator, and a solvent-water mixture stream 19 is obtained at the top of the tower, which is recycled to the lower part of the solvent recovery tower T4. The high-boiling impurity stream 20 which is not vaporized, is extracted from the bottom of the tower. After the treatment in the above process, the composition of raffinate oil after deoxygenation and de-aromatization is shown in Table 2.

TABLE 2

Composition of the raffinate oil in Embodiment 1

| Composition | Content in wt % |
| --- | --- |
| Alkanes | 17.16 |
| Olefins | 81.83 |
| Aromatics | 0.93 |
| Oxygen-containing compounds | 0.08 |

Embodiment 2

The operation conditions of the units in this Embodiment are basically the same as those in Embodiment 1, with the only differences being:

The extractant of the liquid-liquid extraction tower T1 adopts sulfolane as the main solvent, propylene carbonate as the cosolvent, N-methyl-pyrrolidone aqueous solution as the modifier, and 2-nitrophenol as the polymerization inhibitor, wherein the volume ratio between main solvent:cosolvent:modifier is 85:13.5:1.5, wherein the mass ratio of N-methyl-pyrrolidone to water in the modifier is 1:2, and the added amount of the polymerization inhibitor is 0.005% of the total amount of the extractant. After the treatment of the above process, the composition of the raffinate oil after deoxygenation and de-aromatization is shown in Table 3.

TABLE 3

Composition of the raffinate oil in Embodiment 2

| Composition | Content in wt % |
| --- | --- |
| Alkanes | 17.29 |
| Olefins | 81.87 |
| Aromatics | 0.79 |
| Oxygen-containing compounds | 0.05 |

Embodiment 3

The operation conditions of the units in this Embodiment are basically the same as those in Embodiment 1, except that, the extractant of the liquid-liquid extraction tower T1 adopts sulfolane as the main solvent, N-formyl-morpholine as the cosolvent, and N-methyl-diethanolamine aqueous solution as the modifier, tert-butylcatechol as the polymerization inhibitor, wherein the volume ration of main solvent:auxiliary solvent:modifier is 70:29:1, and the mass ratio between N-methyl-diethanolamine and water of the modifier is 1:10, and the added amount of polymerization inhibitor is 0.005 of the total amount of the extractant. After the treatment of the above process, the composition of the raffinate oil after deoxygenation and de-aromatization is shown in Table 4.

TABLE 4

Composition of the raffinate oil in Embodiment 3

| Composition | Content in wt % |
| --- | --- |
| Alkanes | 17.25 |
| Olefins | 81.9 |
| Aromatics | 0.78 |
| Oxygen-containing compounds | 0.07 |

Embodiment 4

The high-temperature Fischer-Tropsch synthetic light oil stream 1 enters the lower part of the liquid-liquid extraction tower T1, and is extracted in countercurrent with the fresh extractant stream 2 entering from the upper part. Sulfolane is used as the main solvent, and tetra-ethylene glycol monomethyl ether is used as a co-solvent, and aqueous solution of 2-pyrrolidone is used as the modifier, and 2-sec-butyl-4,6-dinitrophenol is used as the polymerization inhibitor, wherein the volume ratio of main solvent:co-solvent:modifier is 91:6:3, and the mass ratio of 2-pyrrolidone to water is 1:1 in the modifier, and the added amount of polymerization inhibitor is 0.1% of the total amount of the extractant. Under the conditions that the volume ratio of C9-C11 fractions and extractant is 1, and the number of theoretical extraction stages is 12, and the extraction temperature is 20° C., and the pressure is 0.1 MPa, the raffinate phase stream 3 is extracted at the top of the tower, and the extract phase stream 4 is extracted at the bottom of the tower.

The raffinate phase stream 3 enters the lower part of the water washing tower T2, and is extracted in countercurrent contact with the fresh water stream 5 entering the upper part. The volume ratio of the raffinate phase stream 3 to the fresh water stream 5 is 0.1, and the number of theoretical extraction stages is 6, and the washing temperature is 20° C. and the pressure is 0.1 MPa. The deoxygenated and de-aromatized oil stream 6 is obtained at the top of the tower, and the second water stream Z containing a small amount of solvent is obtained at the bottom of the tower.

The extract phase stream 4 extracted at the bottom of the liquid-liquid extraction tower enters the upper part of the stripping tower T3. Under the conditions that the number of theoretical plates is 40, and the feeding position is at the 20th plate, and the reflux ratio is 6, and the pressure at the top of the tower is controlled to be 0.02 MPa, and the temperature at the top of the tower is 86-88° C., and the temperature at the bottom of the tower is 168-170° C., the aliphatic alkenes+water stream 9 at the top of the tower is obtained and enters the liquid-liquid separator-F1, whereby it is separated into an upper layer and a lower layer in the liquid-liquid separator-F1. The upper aliphatic alkane olefin stream 11 is recycled to the bottom of the extraction tower, and the lower layer forms the water phase stream 12, and the rich solvent stream 10 is obtained at the bottom of the tower.

The rich solvent stream 10 enters the middle part of the solvent recovery tower T4, and the second water stream 7 containing a small amount of solvent extracted at the bottom of the washing tower and stripping tower top water phase stream 12 enter the bottom part of the solvent recovery tower T4 together. Under the conditions that the number of theoretical plates is 15, and the 5th plate from the top is fed, and the reflux ratio is 8, and the operating pressure at the top of the tower is controlled at 0.003 MPa, and the temperature at the top of the tower is 80-85° C., and the temperature of the bottom of the tower is 170-175° C., the oxygen-containing compounds+aromatics+water stream 13 enters the liquid-liquid separator two F2, and is separated into two layers of oil and water in the liquid-liquid separator two F2. The upper oil phase is oxygen-containing compounds+aromatics stream 15, and the lower water phase stream is divided into three streams and recycled to the water washing tower T2, the stripping tower T3 and the regenerative distillation tower T5 respectively. The regenerated extractant stream obtained at the bottom of the tower is divided into two streams. One is the first lean solvent stream 14, which recycles to the liquid-liquid extraction tower T1, and the other is a second lean solvent stream 17, which goes to the regeneration distillation tower T5.

The lean solvent stream enters the regenerative distillation tower T5. Under the conditions that the ratio of the amount of lean solvent entering the regenerative distillation tower to the amount of lean solvent extracted from the bottom of the solvent recovery tower is 0.2, and the temperature of the evaporator is 170° C., and the pressure is 25 kPa, the solvent and water is heated and evaporated in the evaporator, and a solvent-water mixture stream 19 is obtained at the top of the tower, which is recycled to the lower part of the solvent recovery tower T4, and the high-boiling impurity stream 20 which is not evaporated is extracted from the bottom of the tower. After the treatment of the above process, the composition of the raffinate oil after deoxidization and de-aromatization is shown in Table 5.

TABLE 5

Composition of the raffinate oil in Embodiment 4

| Composition | Content in wt % |
|---|---|
| Alkanes | 17.44 |
| Olefins | 82.34 |
| Aromatics | 0.20 |
| Oxygen-containing compounds | 0.02 |

Embodiment 5

The high-temperature Fischer-Tropsch synthetic C9-C11 light oil stream 1 enters the lower part of the liquid-liquid extraction tower T1, and is extracted in countercurrent with the extractant stream 2 entering from the upper part. Sulfolane is used as the main solvent, di-propylene glycol is used as the cosolvent, and N-methyl-diethanolamine aqueous solution is used as the modifier, and tert-butylcatechol is used as the polymerization inhibitor, wherein the volume ration of main solvent:cosolvent:modifier is 60:39:1, and the mass ratio of N-methyl-diethanolamine with water in the modifier is 0.1, and the added amount of the polymerization inhibitor is 0.001% of the total amount of the extractant. Under the conditions that the volume ratio of C9-C11 fraction to the extractant is 8, and the theoretical extraction stages is one, and the extraction temperature is 100° C., and the pressure is 0.5 MPa, the raffinate phase stream 3 is extracted at the top of the tower, and the extract phase stream 4 is extracted at the bottom of the tower.

The raffinate phase stream 3 enters the lower part of the water washing tower T2, and is extracted in countercurrent contact with the fresh water stream 5 entering the upper part. The volume ratio of the raffinate phase stream 3 to the fresh water stream 5 is 2, and the number of theoretical extraction stages is one, and the washing temperature is 60° C. and the pressure is 0.5 MPa, an deoxygenated and de-aromatized oil stream 6 is obtained at the top of the tower, and a second water stream 7 containing a small amount of solvent is obtained at the bottom of the tower.

The extraction phase flow 4 extracted at the bottom of the extraction tower enters the upper part of the stripping tower T3. Under the conditions that the number of theoretical plates is 10, and the 2nd plate from the top is fed, and the reflux ratio is 1, and the operation pressure at the top of the tower is 0.015 MPa, and the temperature at the top of the tower is 85-87° C., and the temperature at the bottom of the tower is 166-168° C., the aliphatic alkenes+water stream 9 is obtained at the top of the tower, and enters the liquid-liquid separator-F1, and is divided into an upper layer and a lower layer in the liquid-liquid separator-F1. The upper layer forms the aliphatic alkene stream 11 and recycles to the bottom of the extraction tower to increase the yield of the aliphatic alkene in the raffinate. The lower layer forms the water phase stream 12, and the rich solvent stream 10 is obtained at the bottom of the tower.

The rich solvent stream 10 enters the middle part of the solvent recovery tower T4, and the second water stream 7 containing a small amount of solvent extracted at the bottom of the washing tower, and the stripping tower top water phase stream 12 enter the lower part of the solvent recovery tower T4 together. Under the conditions that the number of theoretical plates is 60, and the feed position is at the $30^{th}$ plate from the top, and the reflux ratio is 0.5, and the operating pressure at the top of the tower is controlled at 0.015 Mpa, and the temperature at the top of the tower is 90-95° C., and the temperature at the bottom of the tower is 175-180° C., a condensed liquid stream is obtained at the top of the tower and enters the liquid-liquid separator two F2, and is divided into two layers of oil and water in the liquid-liquid separator two F2. The upper oil phase layer forms an oxygen-containing compounds+aromatics stream 15, and the lower layer forms a water phase stream which is divided into three streams, which are recycled to the water washing tower T2, the stripping tower T3, and the regenerative distillation tower T5 respectively. The regenerated extractant stream extracted from the bottom of the tower is divided into two streams. One forms the first lean solvent stream 14, which recycles to the liquid-liquid extraction tower T1, and the other forms the second lean solvent stream 17, and goes to the regenerative distillation tower T5.

The lean solvent stream enters the regenerative distillation tower T5. Under the conditions that the ratio of the second lean solvent stream 17 entering the regenerative distillation tower to the amount of lean solvent extracted from the bottom of the solvent recovery tower is 0.05, and the temperature of the evaporator is 170° C., and the pressure is 30 kPa, the solvent and water is heated and evaporated in the evaporator, and a solvent-water mixture stream 19 is obtained at the top of the tower, which is returned to the lower part of the solvent recovery tower T4, and the high-boiling impurity stream 20 which is not evaporated, is extracted at the bottom of the tower. After the treatment of the above process, the composition of the raffinate oil after deoxygenation and de-aromatization is shown in Table 6.

TABLE 6

Composition of the raffinate oil in Embodiment 5

| Composition | Content in wt % |
|---|---|
| Alkanes | 17.37 |
| Olefins | 81.35 |
| Aromatics | 1.18 |
| Oxygen-containing compounds | 0.1 |

According to the composition characteristics of the C9-C11 fractions of the high-temperature Fischer-Tropsch synthetic light oil, the present invention develops a composite extractant with high selectivity for oxygen-containing compounds and aromatics, which removes the aromatics and the oxygen-containing compounds in the oil at the same time. Furthermore, by adding a modifier and a polymerization inhibitor, the stability of the solvent is adjusted and enhanced. Compared with the existing technologies that separates only the oxygen-containing compounds or only the aromatics in the oil, the present invention has the advantages of having a simple process flow and a low cost.

The above-mentioned embodiments only express several implementation modes of the present invention, and the descriptions thereof are relatively specific and detailed, but should not be construed as limiting the patent scope of the present invention. It should be pointed out, that those skilled in the art can make several modifications and improvements without departing from the concept of the present invention, and these all belong to the protection scope of the present invention. Therefore, the protection scope of the present invention should be determined by the appended claims.

Those skilled in the art should understand that although the present invention is described in terms of multiple embodiments, but not that each embodiment only includes an independent technical solution. The description hereby is only for the sake of clarity, and those skilled in the art should understand the description as a whole, and understand the present invention by considering the technical solutions involved in each embodiment as being able to be combined with each other to form different embodiments.

The invention claimed is:

1. A separation method of high-temperature Fischer-Tropsch synthetic light oil, characterized by comprising steps:
    subjecting the high-temperature Fischer-Tropsch synthetic light oil (1) and a composite extractant (2) to a countercurrent single-stage or multi-stage extraction process in an extraction equipment (T1), to obtain a raffinate phase stream (3), and an extract phase stream (4) with oxygen-containing compounds+aromatics;
    washing the raffinate phase stream (3) with a first water stream (5), to obtain a deoxygenated and de-aromatized oil stream (6), and a second water stream (7) containing a small amount of solvent;
    subjecting the extract phase stream (4) to an extractive distillation process, wherein one or more solvents in the extract phase stream (4) are used as extractants to carry out the extractive distillation process, to separate oxygen-containing compounds and aromatics carried by the extract phase stream (4) to obtain a recycled stream rich in alkanes and olefins (9) and a solvent-rich stream (10).

2. The separation method according to claim 1, wherein in the steps:
    the high-temperature Fischer-Tropsch synthetic light oil (1) first enters a lower part of a liquid-liquid extraction tower (T1), and is extracted in countercurrent with the composite extractant (2) entering from an upper part of the liquid-liquid extraction tower (T1), whereby the raffinate phase stream (3) is extracted at a top of the liquid-liquid extraction tower (T1), and the extract phase stream (4) with oxygen-containing compounds+aromatics is extracted at a bottom of the liquid-liquid extraction tower (T1); and,
    the raffinate phase stream (3) enters a lower part of a water washing tower (T2), and after contacting in countercurrent with the first water stream (5) entering from an upper part of the water washing tower (T2), whereby the oxygenated and de-aromatized oil stream (6) is obtained at a top of the water washing tower (T2), and the second water stream (7) containing a small amount of solvent is obtained at a bottom of the water washing tower (T2); and,
    the extract phase stream (4) enters an upper part of a stripping tower (T3), and a water stream rich in alkanes and olefins (9) obtained at a top of the stripping tower (T3), and the solvent-rich stream (10) is obtained at the bottom of the stripping tower (T3).

3. The separation method according to claim 1, characterized in that, the composite extractant (2) comprises components of volume percentage:
a main solvent of 60-95%, a cosolvent of 1-40%, a modifier of 0.1-3%, and a polymerization inhibitor of 0.001-0.1%.

4. The separation method according to claim 3, characterized in that,
the main solvent is a sulfolane;
the cosolvent is one of the following compounds or a mixture of more than one of the following compounds: a propylene carbonate, a levulinic acid, a dipropylene glycol, a tetraethylene glycol monomethyl ether and an N-formyl-morpholine;
the modifier is an aqueous solution of one or more of the following compounds: diethanolamine, N-methyl-diethanolamine, N-methyl-pyrrolidone, and 2-pyrrolidone;
the polymerization inhibitor is one of the following compounds or a mixture of more than one of the following compounds: hydroquinone, tert-butylcatechol, 2-o-nitrophenol and 2-sec-butyl-4,6-dinitrophenol.

5. The separation method according to claim 1, characterized in that,
the high-temperature Fischer-Tropsch synthetic light oil (1) is produced by a fluidized bed process at a reaction temperature of 350-400° C. and a pressure of 2.0-2.5 MPa, wherein the C5-C11 fraction is obtained by a separation process in a fractionation tower, and a C12+ fraction of the light oil is less than 0.1 wt %.

6. The separation method according to claim 2, characterized in that,
an operating temperature of the liquid-liquid extraction tower (T1) is 20-100° C., and an operating pressure is 0.1-0.5 MPa, and a volume ratio between the composite extractant (2) and the Fischer-Tropsch synthetic light oil (1) in the liquid-liquid extraction tower (T1) is 1-8, and a number of extraction stages is 1-12.

7. The separation method according to claim 2, wherein:
the stripping tower (T3) is configured such that, a theoretical plate number is 10-40, and a feed position is at the $3^{rd}$-$20^{th}$ plate from top, and a reflux ratio is 0.5-8, and a pressure at a top of the stripping tower (T3) is 5-30 kPa, and a temperature at the top is 70-100° C. and a temperature at the bottom is 140-180° C.

8. The separation method according to claim 5, characterized in that,
the high-temperature Fischer-Tropsch synthetic light oil (1) is composed of: 10-20 wt % of alkanes, 55-65 wt % of olefins, 5-15 wt % of aromatics and 5-15 wt % of oxygen-containing compounds.

9. The separation method according to claim 2, characterized in that,
an operation temperature of the water washing tower (T2) is 20-60° C., and a pressure thereof is 0.1-0.5 MPa, and a volume ratio between water (5) and raffinate (3) is 0.1-2, and a number of washing stages is 1-6.

10. The separation method according to claim 2, characterized by comprising:
condensing and introducing the water stream rich in alkanes and olefins (9) into a liquid-liquid separator one (F1), whereby an aliphatic alkene stream (11) is separated at an upper layer and is recycled to the lower part of the liquid-liquid extraction tower (T1), and a stripping tower top water phase stream (12) is separated at a lower layer of the separator one (F1).

11. The separation method according to claim 10, characterized by comprising:
introducing the second water stream (7) with a small amount of solvent obtained at the bottom of the water washing tower (T2), the stripping tower top water phase stream (12), and the solvent-rich stream (10) obtained at the bottom of the stripping tower (T3) into a solvent recovery tower (T4) for vacuum stripping;
whereby an oxygen-containing compounds+aromatics+water stream (13) is obtained at a top of the solvent recovery tower (T4), and a lean solvent stream (14) is obtained at the bottom of the solvent recovery tower (T4).

12. The separation method according to claim 11, characterized by comprising:
condensing and then introducing the oxygen-containing compounds+aromatics+water stream (13) into a liquid-liquid separator two (F2), to achieve a separation into two phases of oil and water, wherein an upper layer is an oxygen-containing compounds+aromatics stream (15), and a lower layer is a solvent recovery tower overhead water phase stream (16).

13. The separation method according to claim 12, characterized by comprising:
introducing part of the lean solvent stream obtained at the bottom of the solvent recovery tower (T4) into a regenerative distillation tower (T5), and utilizing the solvent recovery tower overhead water phase stream (16) as a stripping agent to carry out a vacuum stripping distillation process in the regeneration distillation tower (T5),
wherein solvents and water are heated and evaporated in an evaporator, forming a solvent-water mixture stream (19) at a top of the regenerative distillation tower (T5), which recycles to a lower part of the solvent recovery tower (T4), and,
wherein impurities with high boiling points (20) which are not vaporized, are extracted from a bottom of the regenerative distillation tower (T5).

14. The separation method according to claim 13, characterized by comprising:
dividing the solvent recovery tower overhead water-phase stream (16) into three streams which are recycled to the water washing tower (T2), the stripping tower (T3), and the regeneration distillation tower (T5) respectively.

15. The separation method according to claim 13, characterized by comprising:
dividing the lean solvent stream into two streams, wherein a first lean solvent stream (14) is recycled to the liquid-liquid extraction tower (T1) and a second lean solvent stream (17) is introduced to the regeneration distillation tower (T5).

16. The separation method according to claim 11, characterized in that,
the solvent recovery tower (T4) is configured such that, a theoretical plate number is 15-60, and a feeding position is at the 5th-50th plate from top, and a reflux ratio is 0.5-8, and a pressure at the top is 5-30 kPa, and a temperature at the top is 70-120° C., and a temperature at the bottom is 150-185° C.

17. The separation method according to claim 13, characterized in that,
the regenerative distillation tower (T5) is a vacuum distillation tower configured such that, a mass ratio between the second lean solvent stream (17) and the lean solvent stream obtained at the bottom of the solvent recovery tower (T4) is 0.01-0.2, and an operating pressure at the bottom of the regenerative distillation tower (T5) is 5-30 kPa, and a temperature thereof is 130-190° C.

* * * * *